Aug. 24, 1965     E. GERSON     3,202,741
METHOD OF MANUFACTURING SHEET MATERIAL WITH
TEXTURED PEARLY SURFACE
Filed Nov. 9, 1961
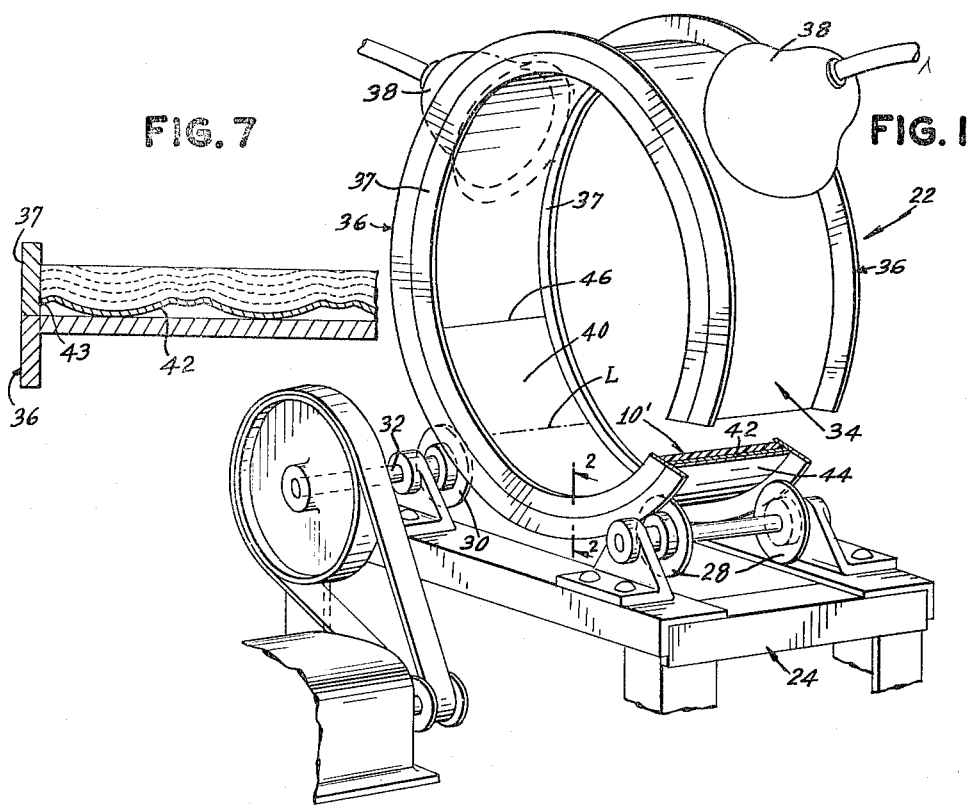
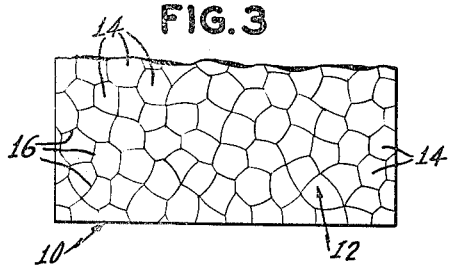
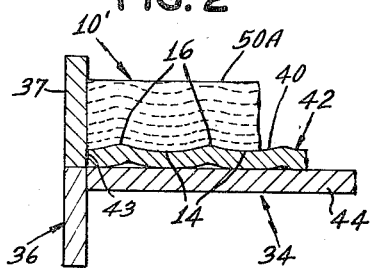
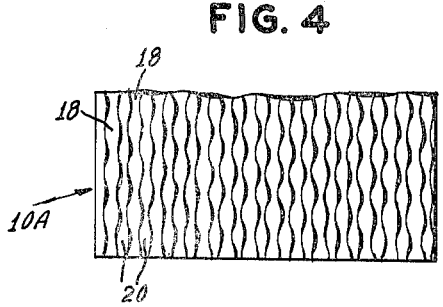
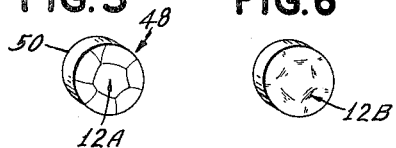
INVENTOR.
Edward Gerson
BY
ATTORNEYS

United States Patent Office 3,202,741
Patented Aug. 24, 1965

3,202,741
METHOD OF MANUFACTURING SHEET MATERIAL WITH TEXTURED PEARLY SURFACE
Edward Gerson, Great Neck, N.Y., assignor, by mesne assignments, to Patrician Plastic Corp., Long Island City, N.Y., a corporation of Maine
Filed Nov. 9, 1961, Ser. No. 152,711
3 Claims. (Cl. 264—108)

This application is a continuation-in-part of my copending application Serial No. 769,392, filed October 24, 1958 now abandoned.

This invention relates to pearly plastic sheet material and to a method for the manufacture thereof. While useful for other purposes, the pearly plastic sheet material of this invention is especially well adapted for the manufacture of simulated pearl buttons.

One of the objects of this invention is to produce pearly plastic sheet material with an enhanced pearly appearance which is more nearly similar in appearance to the pearly surface of natural mother-of-pearl especially in respect to irregularities of surface appearance and iridescence of natural mother-of-pearl. More generally stated, however, in accordance with the primary object of the present invention, the pearly plastic sheet material has a pearly sheen or lustre which differs from the usual simulated pearly material in having a degree of irregularity more nearly like that of natural mother-of-pearl.

Another object of the present invention is the provision of a method which is well adapted for producing pearly plastic sheet material pursuant to the above stated objects of the present invention.

The above and other objects, features and advantages of this invention will be more fully understood from the description considered in connection with the accompanying illustrative drawings.

In the drawings:

FIG. 1 is a perspective view of a centrifugal casting machine for carrying out the method of the present invention, with a part cut away for purposes of illustration;

FIG. 2 is a fragmentary sectional view, on a larger scale, on the line 2—2 of FIG. 1;

FIG. 3 is a top plan view of a piece of pearly plastic sheet material produced by the present invention;

FIG. 4 is a view similar to FIG. 3 showing the material with a different patterned surface;

FIG. 5 is a perspective view of a button blank formed of the material illustrated in FIG. 3;

FIG. 6 is a perspective view of the button blank after an additional processing operation is performed thereon for the manufacture of the button; and FIG. 7 is a fragmentary sectional view similar to FIG. 2, but with the material of the pattern of FIG. 4.

In accordance with my present invention, the pearly plastic sheet material may be, and preferably is, produced from a plastic mix consisting essentially of a polymeric unsaturated polyester resin and styrene, pearl essence, a catalyst and a catalyst promoter, as described in United States Patent No. 2,856,635 to Gerson and Bruins. It will be understood, however, that the plastic mix utilized in the present invention may consist essentially of any suitable cross-linked polyester resin such as, for example, but without limitation, any suitable combination of a polymeric unsaturated polyester resin and a vinyl monomer which, like the polymeric unsaturated polyester resin specifically described in said patent, is polymerizable first to a flaccid condition and thereafter to a rigid condition.

Referring to FIGS. 2 and 3, it will be observed that the pearly plastic sheet material 10 has a patterned surface which is illustrated as a "pebbled" surface 12, comprising a multiplicity of small projections 14 on one surface of the sheet outlined by shallow thin recesses or depressed lines 16. It will be understood, however, that the present invention is by no means limited to the pebbled surface pattern illustrated by FIGS. 2 and 3 but, on the contrary, the patterned surface may have any other relief pattern formed of comparatively small protuberances and depressions, one of these many other patterns being illustrated in FIG. 4 where the surface of the pearly plastic sheet material 10A has a wavy patterned surface formed by rows 18 of projections or protuberances alternating with rows 20 of depressions. While the raised and depressed portions of the patterned surface may vary within wide limits, it may be stated by way of illustration that the patterned surfaces of FIGS. 3 and 4, for example, have raised portions of approximately the size and shape illustrated. The depth of the patterns, that is, the difference in height between the bottom of a depression and the top of a protuberance, may vary within suitable limits, say between 0.015 inch and 0.050 inch. In the case of the pebbly pattern illustrated in FIG. 2, the preferred depth is about 0.025 inch.

As described in the above-mentioned United States Patent No. 2,856,635, the pearly plastic sheet material is produced first in the form of a tube or cylinder by casting the plastic mix in a centrifugal casting machine. The centrifugal casting machine 22, according to the present invention, is illustrated in FIG. 1. Said machine includes a suitable base or support 24 on which the cylinder or drum is mounted for rotation on the spaced pairs of flanged wheels or roller bearings 28 and 30. Wheels 30 are driven by a motor actuated shaft 32 for rotating cylinder 34. It will be observed that the drum comprises a cylinder 34 which, it will be understood, is peripherally continuous, and has flanges 36 at the opposite sides thereof. The flanges 37 which extend radially inwardly, i.e., upwardly, beyond the inner surface of the cylinder are provided to prevent the plastic-pearl essence mix from running out of the drum before the plastic attains a gelated condition. Heating means which may be in the form of infra-red lamps 38 may be employed for heating the drum.

As thus far described, the centrifugal casting machine is essentially of the same construction as the machine described in the above-mentioned patent, but in accordance with the present invention the inner cylindrical surface 40 of the drum instead of being smooth is provided with an overall relief pattern corresponding to the surface pattern which is to be produced on the plastic sheet material as described above with reference to FIGS. 3 and 4. Said patterned surface may be formed directly on the inner surface of the cylinder or as here shown it is formed on a removable liner 42 (FIGS. 1 and 2) disposed on the cylinder wall 44 of the drum. As illustrated in FIGS. 1, 2 and 7, the cylindrical flanges 37 at each end of the rotary cylinder are secured to the side edges of the liner 42, by welding, as indicated at 43 or in any other suitable way. Patterning liner 42 may be formed of any suitable sheet metal or other suitable sheet material, but is preferably formed of stainless steel or aluminum, stainless steel being preferred over aluminum. The metal of which the liner 42 is formed is thin enough to be easily bent into the cylindrical form from a flat sheet, a thickness of about 0.010 inch to about 0.025 inch being practical for this purpose. It will be understood that the sheet for forming the liner 42 is of such width and length that it may be formed into the cylinder and placed against the cylindrical wall 44 of the drum, after which the abutting ends of the cylindrical liner sheet may be welded together as indicated at 46. It will be understood that the liner for forming sheet material with one selected patterned surface may be removed from the drum and replaced by a different liner for forming sheet material of a different selected patterned surface. Also, as previously stated, it is within the scope of the present invention to provide the patterned surface directly on the inner surface of the cylinder, without the use of a liner, and one or a plurality of cylinders or a plurality of centrifugal casting machines for producing pearly plastic material with a patterned surface may be utilized in the commercial practice of the invention.

In practicing the method of the present invention for producing the pearly plastic sheet material, the plastic mix which is preferably substantially the same as the plastic mix described in the above-mentioned patent, according to the preferred example specified therein, is introduced into the drum by pouring or flowing the plastic mix slowly onto the inner surface of the liner 42 while the drum is being rotated by the motor actuating shaft 32 at a suitable speed, say a speed of approximately 40 r.p.m. when, as specified in said patent, the drum has a diameter of 30 inches. The quantity of the plastic mix introduced into the drum should be sufficient to form a tube approximately one-eighth inch thick. When the drum has a diameter of 30 inches and an inner width of about 11½ inches, a tube of this thickness may be formed from about 2200 grams of the plastic mix as stated in said patent.

I have discovered that as a result of providing the drum with an irregular inner surface, i.e., a surface having a multiplicity of protuberances, as distinguished from a smooth surface, and as a result of the rotation of the drum while the plastic mix is being introduced and while the plastic is being formed into a tube or cylinder during the rotation of the drum, the particles of pearl essence in the plastic mix are disposed in such manner in the layer of the plastic, particularly the portion of the layer adjacent the surface of the cylinder or cylinder liner 42, that the resulting lustre is enhanced and the surface of the plastic sheet material has an irregular appearance which combines with the increased lustre to produce in the button or other article, after the surface of the button or other article blank is ground and polished in the usual way as practiced in the art of button manufacture, an enhanced pearly appearance.

The pearl essence may be of the character described in said patent or may be of any other suitable type, but I prefer to use pearl essence of the synthetic type which is derived from metallo-organic compounds exhibiting plate-like crystal habit and which also may have iridescence, in contrast with the so-called natural pearl essence which is derived from fish scales. An iridescent pearl essence of this type is readily available on the market and may be purchased, for example, from the Mearl Company, New York, N.Y. I have found that the iridescent effect is improved in accordance with the present invention by reason of the irregular or non-smooth surface of the cylinder of the centrifugal casting machine 22, and I attribute this improved lustre and iridescence to the action of the irregular surface of the cylinder in distributing the pearl essence in minutely varying or different positions in the plastic cylinder produced from the plastic mix by the operation of the rotating cylinder 34 while the plastic mix is being poured onto said surface and while the plastic tube or cylinder is being formed during the rotation of cylinder 34. Thus, as illustrated for example in FIGS. 2 and 7, the plate-like pearly particles ar crystals of the pearl essence orient themselves more or less parallel to the wavy surface on which the plastic is cast, that is, the plate-like particles are oriented throughout substantially the entire plastic sheet with their plate faces in a nonplanar, generally-parallel arrangement characterized by a multiplicity of shallow departures from parallelism with the faces of the plastic sheet. This is illustrated by the dotted wavy lines in FIGS. 2 and 7 of the drawings.

It will be understood that as described in said patent, when the plastic mix consists essentially of a cross-linking resin, the plastic tube or cylinder formed therefrom is removed from the drum while it is in a flaccid condition, but strong enough to be removed without disintegration. This is readily accomplished by first cutting the gelated plastic cylinder as indicated for example by the broken line L in FIG. 1. After the cylinder is removed from the drum and while it is still in a flaccid condition, it is placed on a flat support so as to form a flat sheet therefrom. Also, while the flat sheet is still in flaccid condition, the button blanks, one of which is designated 48 and indicated at FIG. 5, are punched from the sheet material, as described in said patent. In this condition of the button blank 48, it has a smooth surface 50 corresponding to the smooth surface 50A of the cast sheet material, and it has a patterned surface 12A comprising several of the projections and recesses 14 and 16 of the cast sheet material. However, after the punched blanks 48 are cured, i.e., after the completion of the cross-linking of the resin, the blank 48 is ground and polished, as heretofore in the manufacture of simulated pearl buttons, with the result that the protuberances are removed or considerably reduced in thickness whereby said surface has a substantially smooth and highly lustrous appearance and yet has an irregular appearance resulting from the formation of the protuberances and depressions in the surface of the sheet material during the casting operation and the controlled orientation or varied arrangement of the particles of the pearl essence in the cast plastic sheet resulting from the provision of the relief pattern on the inner surface of the cylinder of the casting machine and as a result of pouring the plastic material on to the surface of the cylinder while it is rotated, as described above.

While I have shown and described the preferred mode of practicing my invention, it will be understood that the invention may be practiced in other ways than that herein specifically illustrated or described. Also, it will be understood that while the pearly sheet material having a patterned surface is especially valuable for the producing of simulated pearl buttons, said pearly sheet material may be used for various other purposes, for example, but without limitation, as ornamental coverings or panels, in articles of jewelry, etc. Also, it will be understood, of course, that while I have illustrated two different relief patterns for the pearly plastic sheet material, numerous other patterns may be utilized without departing from the underlying idea or principles of the present invention. Accordingly, I do not wish to be limited to the invention as herein specifically illustrated or described except to the extent which may be required by the scope of the appended claims.

I claim:

1. In the method of making pearly plastic sheet material in which a fluid mixture of a polymeric unsaturated polyester resin and plate-like particles of pearl essence is centrifugally cast by flowing the fluid mixture slowly into contact with the inner surface of a rotating cylindrical vessel wherein the mixture is polymerized to a flaccid condition, the resulting tube with the pearl essence oriented therein for nacreous appearance is cut longitudinally while in the flaccid condition so as to form a flat sheet from which an article blank can be punched before the chemical cross-linking of the resin is completed with resulting hardening thereof, the improvement which comprises providing the cylindrical vessel with a patterned interior surface having a multiplicity of shallow depressions and protuberances, the flowing of the aforesaid mixture into contact with the patterned inner surface effecting, by movement of the patterned inner surface relative to the fluid mixture, orientation of the plate-like particles of pearl essence throughout substantially the entire thickness of the flaccid tube in a generally-parallel arrangement with respect to the pattern of said inner surface.

2. The method according to claim 1 which includes the further step of grinding smooth the patterned surface of the article blank after chemical cross-linking has been substantially completed, with resulting formation of a smooth-surfaced blank having a pearly appearance enhanced by the generally-parallel orientation of the plate-like particles of pearl essence throughout the blank.

3. The method according to claim 1 in which the depth of the pattern of depressions and protuberances in the patterned inner surface is within the range of about 0.015 to 0.05 inch.

References Cited by the Examiner

UNITED STATES PATENTS

| | | | |
|---|---|---|---|
| 1,599,534 | 9/26 | Kerley | 264—227 |
| 1,899,258 | 2/33 | Bush | 18—44 |
| 2,475,375 | 7/49 | Clark | 264—108 |
| 2,836,855 | 6/58 | Hawkinson | 18—44 |
| 2,856,635 | 10/58 | Gerson et al. | 264—73 |
| 2,892,218 | 6/59 | McGhee et al. | 18—58.3 |
| 2,918,703 | 12/59 | Beal | 18—58.3 |
| 2,914,436 | 11/59 | Nakielny | 154—43 |
| 2,990,306 | 6/61 | Dyer | 154—43 |

ALEXANDER H. BRODMERKEL, *Primary Examiner.*

MICHAEL V. BRINDISI, *Examiner.*